United States Patent
Francis, Jr. et al.

[11] Patent Number: 5,266,025
[45] Date of Patent: Nov. 30, 1993

[54] COMPOSITE LANCE

[75] Inventors: Arthur W. Francis, Jr., Monroe; Hisashi Kobayashi, Putnam Valley; Geoffrey B. Tuson, Yorktown Heights, all of N.Y.

[73] Assignee: Praxair Technology, Inc., Danbury, Conn.

[21] Appl. No.: 888,506

[22] Filed: May 27, 1992

[51] Int. Cl.$^5$ ............ F23C 7/00; F23C 9/00; B05B 7/00
[52] U.S. Cl. ................ 431/187; 431/115; 239/DIG. 9; 239/600; 239/425; 239/424.5; 239/132.5
[58] Field of Search .......... 431/349, 159, 350, 9, 431/10, 115, 187; 239/132.5, DIG. 9, 291, 424.5, 425, 425.5, 349, 552, 558, 113, 597, 600

[56] References Cited

U.S. PATENT DOCUMENTS

| | | | |
|---|---|---|---|
| 2,138,998 | 12/1938 | Brosius | 431/187 X |
| 2,862,545 | 12/1958 | Snow et al. | 431/187 X |
| 2,992,459 | 7/1961 | Campbell et al. | 431/349 |
| 4,105,395 | 8/1978 | Goodnight et al. | 431/187 |
| 4,693,680 | 9/1987 | Snyder et al. | 431/10 |
| 4,717,334 | 1/1988 | Newman | 431/187 |
| 4,738,614 | 4/1988 | Snyder et al. | 431/8 |
| 4,878,829 | 11/1989 | Anderson | 431/8 |
| 4,892,475 | 1/1990 | Farrenkopf et al. | 431/8 |
| 4,907,961 | 3/1990 | Anderson | 431/8 |
| 4,946,382 | 8/1990 | Kobayashi et al. | 431/8 |
| 4,969,814 | 11/1990 | Ho et al. | 431/8 |
| 5,076,779 | 12/1991 | Kobayashi | 431/5 |
| 5,100,313 | 3/1992 | Anderson et al. | 431/8 |
| 5,110,285 | 5/1992 | Snyder et al. | 431/8 |

FOREIGN PATENT DOCUMENTS

| | | | |
|---|---|---|---|
| 0310327 | 4/1989 | European Pat. Off. | 431/187 |
| 3144574 | 5/1983 | Fed. Rep. of Germany | 431/349 |
| 2098642 | 3/1972 | France | 431/8 |
| 690133 | 7/1970 | Netherlands | 431/187 |

*Primary Examiner*—Carl D. Price
*Attorney, Agent, or Firm*—Stanley Ktorides

[57] ABSTRACT

A lance and gas injection system wherein the lance comprises a metallic supply tube and a two piece small diameter nozzle comprising a metallic backpiece and a ceramic frontpiece.

12 Claims, 2 Drawing Sheets

COMPOSITE LANCE

TECHNICAL FIELD

This invention relates generally to lances and is particularly useful for the injection of high velocity gas into a combustion zone.

BACKGROUND ART

Recent advances in combustion technology have employed the use of high velocity gas injection into a combustion zone to carry out combustion with reduced nitrogen oxides ($NO_x$) generation. Nozzles with relatively small diameters are employed in order to achieve the high velocities. The high gas velocities cause furnace gases to be aspirated or entrained into the high velocity gas which has a dampening effect on $NO_x$ generation.

A problem with high velocity gas injection into a combustion zone is that the furnace gases, which may comprise particulate matter and condensible vapors, cause the nozzles, which have small openings to begin with, to foul or corrode easily as the furnace gases are aspirated or entrained into the high velocity gas exiting the nozzle. The furnace gases also tend to be quite hot, on the order of 1000° F. or more, which exacerbates the fouling and corrosion problem. This problem becomes particularly severe when the furnace temperature exceeds 2200° F. The maximum service temperatures of common high temperature alloys are less than 2200° F. for fuel-fired furnace atmospheres. Some noble metals such as platinum can withstand higher temperatures, but the cost becomes excessive.

One way of dealing with this problem has been to provide a large amount of water cooling to the nozzle so as to prevent high temperature corrosion or melting. However, a water cooling system is complex to operate and does not address the fouling problem where the furnace atmosphere has a high particulate content. Moreover, water cooling can escalate the corrosion and fouling problems when the furnace atmosphere contains condensible vapors.

Ceramic lances have been proposed as a solution to the fouling problem in high velocity gas injection. However, presently available ceramic lances are not suitable for industrial scale operations because of corrosion and cracking due to thermal and other stresses.

It is known that temperature effects on a nozzle may be ameliorated by recessing the nozzle in a cavity communicating with a combustion zone. However, a relatively large recess is required to achieve a significant beneficial effect. With high velocity gas injection, such a large recess may be detrimental because a large amount of corrosive furnace gas may be drawn into the cavity. Furthermore, this results in a reduction in the gas jet velocity. Thus, while the nozzle avoids temperature induced damage, this is offset by increased damage caused by contact with corrosive furnace gas drawn into the cavity.

Accordingly, it is an object of this invention to provide a lance which may be employed in a high velocity gas injection system and which will enable effective gas injection with reduced damage caused by high temperatures and corrosive gases.

SUMMARY OF THE INVENTION

The above and other objects which will become apparent to one skilled in the art upon a reading of this disclosure are attained by the present invention one aspect of which is:

A composite lance comprising:
(A) a supply tube comprised of metal;
(B) a nozzle having a backpiece and a frontpiece, said backpiece comprised of metal and communicating with the supply tube, said frontpiece comprised of ceramic and adjoining said backpiece;
(C) at least one aperture through which gas may be ejected from the ceramic frontpiece of the nozzle; and
(D) means for providing protective gas around the nozzle.

Another aspect of the invention is:

A composite lance gas injection system comprising a cavity within a wall of a combustion zone and having an opening communicating with the combustion zone, and a composite lance within the cavity said composite lance comprising:
(A) a supply tube comprised of metal and communicating with a source of gas;
(B) a nozzle recessed from the opening, said nozzle having a backpiece and a frontpiece, said backpiece comprised of metal and communicating with the supply tube, said frontpiece comprised of ceramic and adjoining said backpiece;
(C) at least one aperture through which gas may be ejected from the ceramic frontpiece of the nozzle; and
(D) means for providing protective gas around the nozzle.

As used herein, the term "lance" means a device through which either gaseous oxidant or gaseous combustible matter or a premixed mixture of oxidant and fuel is passed and from which is injected into a cavity or a combustion zone.

As used herein, the term "ceramic" means a non-metallic material which can withstand a temperature greater than 2200° F. Ceramics typically are refractory materials comprising oxides, carbides or nitrides.

DETAILED DESCRIPTION

The invention will be described in detail with reference to the Drawings.

Figure 1:
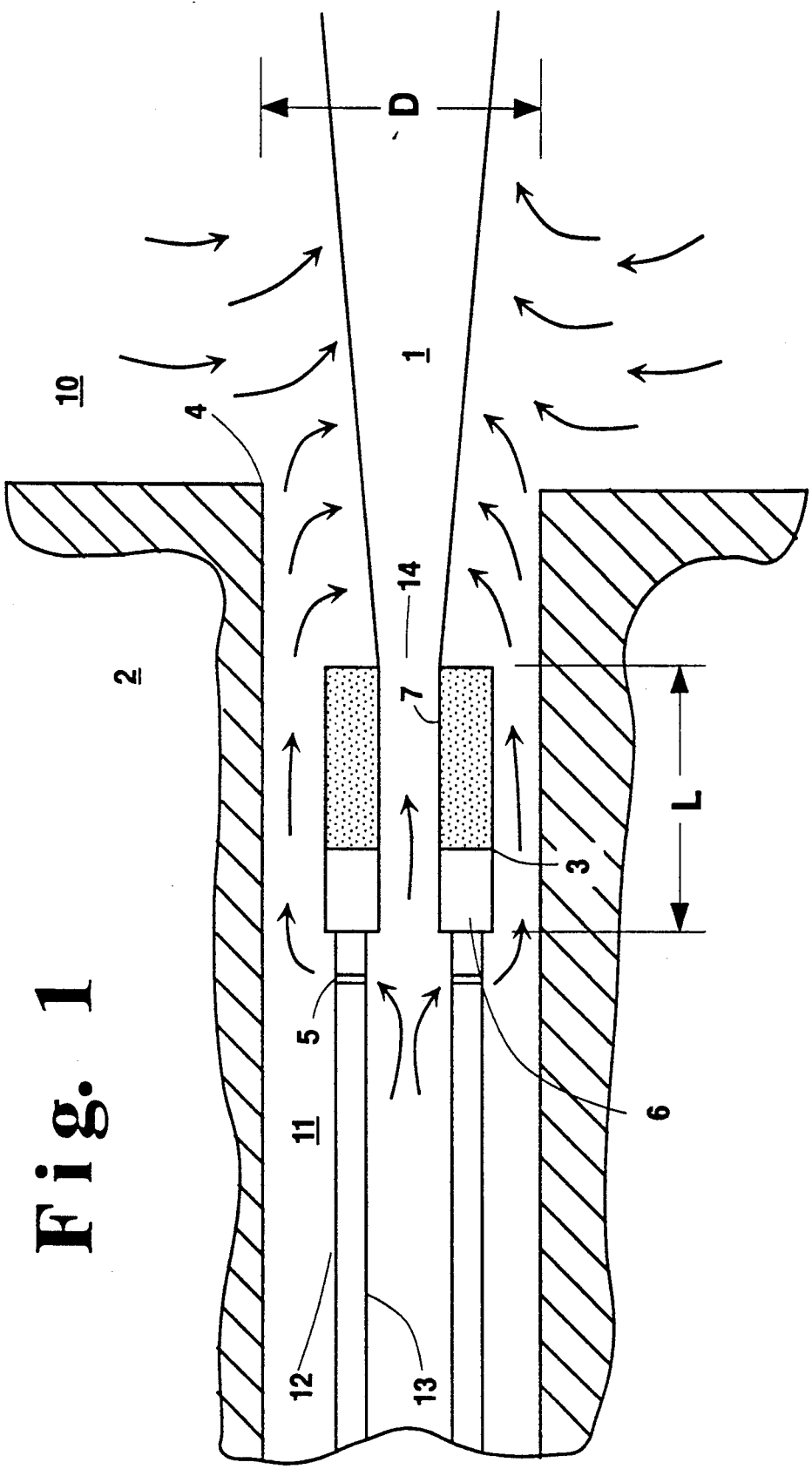
FIG. 1 is a view partly in cross-section of one preferred embodiment of the composite lance and gas injection system of the invention.

Referring now to FIG. 1, refractory wall 2 borders combustion zone 10 wherein there is contained a furnace atmosphere comprising furnace gases such as, for example, carbon dioxide, water vapor, nitrogen and/or oxygen. The furnace atmosphere is generally at an elevated temperature typically exceeding 2000° F. and usually within the range of from 2000° to 3000° F. The furnace atmosphere may also contain particulate matter, such as glass batch materials or ash from coal combustion, and/or condensible vapors such as sodium species or acid vapors.

Within refractory wall 2 there is provided cavity 11 which communicates with combustion zone 10 at opening 4. Generally, opening 4 will have a diameter, denominated in FIG. 1 as D, within the range of from 0.25 to 10 inches.

Within cavity 11 there is positioned composite lance 12. Composite lance 12 is comprised of two parts, a supply tube 13 and a nozzle 3. The supply tube is comprised of metal such as copper, aluminum, stainless steel, other steels, and other high temperature alloys. Preferably supply tube 13 is comprised of copper. In operation, as part of the gas injection system of the invention, supply tube 13 is in flow communication at one end with a source of gas such as oxidant or fuel. At the other end, supply tube 13 communicates with nozzle 3.

Nozzle 3 has a backpiece 6 and a frontpiece 7 and has an axial length denominated in FIG. 1 by L. Backpiece 6 comprises from about 10 to 60 percent of the nozzle axial length and frontpiece 7 comprises from about 40 to 90 percent of the nozzle axial length measured on either the inner or the outer side of the nozzle. Preferably, the nozzle will have an axial length within the range of from 0.5 to 2 times the diameter of the opening. Generally, this will result in a nozzle having an axial length within the range of from 1 to 5 inches. The outer diameter of the nozzle is at least one half of the diameter of cavity 11 and preferably is within the range of from 0.5 to 0.95 times the diameter the cavity or the opening.

Figure 2:
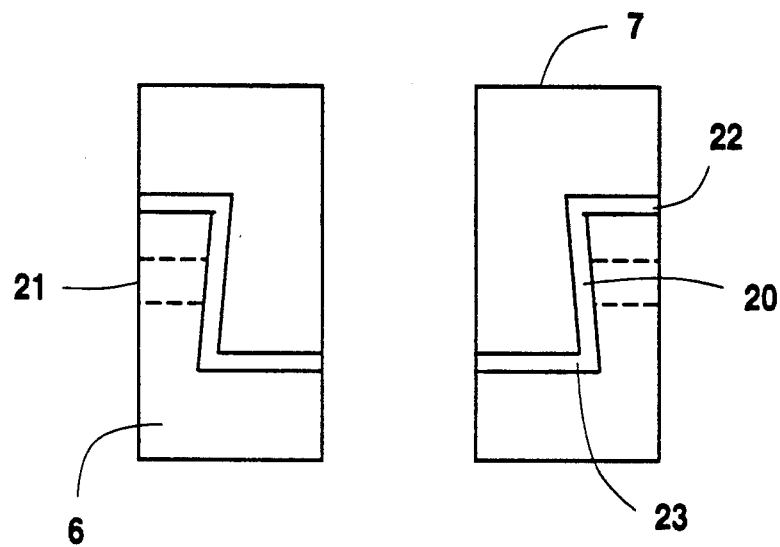
FIG. 2 is a cross-sectional representation of one preferred means by which the ceramic frontpiece is adjoined to the metallic backpiece of the nozzle.

Backpiece 6 is comprised of metal such as stainless steel, cast iron, other steels and other high temperature alloys having maximum service temperatures within the range of from 1500° F. to 2200° F. Preferably backpiece 6 is comprised of a metal different from that comprising supply tube 13. Preferably that metal is stainless steel. Backpiece 6 communicates with supply tube 13. Backpiece 6 is attached to supply tube 13 by welding, brazing, threading or pressfitting. Threading is preferred as this makes the nozzle easily replaceable. Adjoining backpiece 6 of nozzle 3 is frontpiece 7. FIG. 2 illustrates one preferred way of adjoining frontpiece 7 to backpiece wherein the pieces are adjoined by means of a reverse taper joint. Referring now to FIG. 2 there is shown ceramic frontpiece 7 and metallic backpiece 6 mated in a reverse taper configuration. The reverse taper joint gap 20 is filled with refractory ceramic cement similar to the way brick mortar fills the gap between two bricks. Small holes 21 are used to deliver refractory ceramic cement to joint gap 20. Fiber ceramic gaskets 22 and 23 as used against the metallic backpiece to allow the ceramic frontpiece room to expand into the reverse taper joint. Other means of adjoining the ceramic frontpiece to the metallic backpiece include shrink fitting and mechanical locking.

Frontpiece 7 is comprised of ceramic such as refractory materials comprising alumina, silica, zirconia, magnesia or silicon carbide. The preferred ceramic material for glass furnace applications is alumina-zirconia-silicate refractory. The maximum service temperatures of ceramics are typically between 2000° and 4000° F. A ceramic material normally used for the hot side of a furnace wall will generally be useful in the practice of this invention.

Referring back now to FIG. 1, nozzle 3 has an internal diameter denominated in the Figure as d which is generally within the range of from 0.1 to 6 inches, preferably within the range of from 0.1 to 3 inches. In the ceramic frontpiece 7 there is aperture 14, generally of diameter d, through which gas is ejected out from nozzle 3 into cavity 11. Nozzle 3 is recessed from opening 4. Multiple apertures or orifices may be used in the ceramic frontpiece 7 to provide multiple jets from a single nozzle. The composite lance of the invention allows this recess to be relatively small without encountering temperature induced nozzle damage. Generally, the recess or the distance from opening 4 to the ceramic tip of nozzle 3 will not exceed a distance equal to 2D and preferably will not exceed 1D. The annular space between the cavity and the nozzle is generally kept within the range of from 0.1 to 1.0 inch, preferably within the range of from 0.1 to 0.5 inch, in order to reduce radiation heat flux from the hot furnace to the nozzle.

In the practice of the invention, protective or shroud gas is passed around the nozzle and then into the combustion zone. The protective gas may be the same or different from the main gas ejected from the nozzle. The protective gas may be provided by an annular passage coaxial with the composite lance. FIG. 1 illustrates a preferred method for supplying protective gas wherein in the metallic portion of lance 12, preferably in the supply tube, there is one or more apertures 5 through which protective or shroud gas from within lance 12 may pass out from within lance 12 into cavity 11 and around nozzle 3.

In operation, gas is passed from a gas source through supply tube 13 and nozzle 3 into cavity 11 and combustion zone 10 as gas jet 1. The gas may be oxidant such as air, oxygen-enriched air or technically pure oxidant, or may be fuel which is any gas which contains combustibles which may combust in the combustion zone, or it may be a premixture of oxidant and fuel. Among such fuels, one can name natural gas, atomized liquid fuel, coke oven gas, propane, hydrogen and methane. The invention will find particular utility with high velocity gas or atomized fuel injection wherein the gas is ejected out nozzle 3 at a velocity exceeding 200 feet per second up to 2000 feet per second or more. The gas passes into cavity 11 and from there into combustion zone 10 wherein it mixes with furnace gases as indicated by the arrows, and combusts with either fuel or oxidant, as the case may be, to produce further furnace gases.

The high velocity of the gas jet causes furnace gases from the combustion zone to aspirate or entrain into gas jet 1. This aspiration or entrainment of furnace gases into gas jet 1 has a beneficial effect on $NO_x$ generation by providing added non-reactive mass thus reducing the peak flame temperature. The aspiration also causes furnace gas to be drawn toward opening 4. In order to counteract this effect and keep potentially corrosive furnace gases out of cavity 11, protective gas passing out into cavity 11 through apertures 5 upstream from where gas jet 1 is injected into cavity 11 through nozzle 3 is caused to flow by the gas dynamic effect of gas jet 1 around and along nozzle 3 toward opening 4 as indicated by the arrows. This protective gas flow out from apertures 5 at a point further recessed from opening 4 than is the ceramic tip of nozzle 3 is at a low velocity not more than 100 feet per second and generally within the range of from 5 to 100, preferably 10 to 50 feet per second. The low velocity of the protective gas relative to the high velocity main gas ensures that the protective gas is drawn from its recessed position around and past the nozzle and is then entrained into the main gas.

It is an important element of this invention that the protective or purge gas be passed into the cavity at a point further recessed from the opening than the point where the main gas is injected into the cavity. This further recess allows the protective gas to flow around the surface of the nozzle thus serving to protect the nozzle from the hot furnace gases and keeping the furnace gases from being drawn into the cavity.

The protective gas is passed into cavity 11 at a flowrate such that the protective gas is within the range of from 10 to 50 percent, preferably from 10 to 30 percent, of the total gas, i.e. protective gas and main gas, injected into cavity 11. This high flowrate or large amount of protective gas ensures that the protective gas will accomplish the nozzle protection effect and purging function from the potentially incoming furnace gas.

The protective gas flows around the surface and past nozzle 3 as shown by the arrows. Downstream of nozzle 3 the protective gas is entrained into main gas jet 1 and serves as a gas barrier preventing furnace gases from contacting nozzle 3. Thus, furnace gases are substantially prevented from entering the cavity. The main gas and the protective gas combine and flow into the combustion zone where they become the fuel and/or oxidant, for a combustion reaction which generates heat and furnace gases. Thus, plugging or fouling of nozzle 3 is prevented despite its small nozzle diameter even if the furnace atmosphere contains high levels of particulates and/or condensible vapors, such as might be present in a glassmelting vessel. Other applications where the invention may find use include the injection of gases into various high temperature smelting processes, and in waste incineration.

In addition, the protective gas simultaneously provides a cooling effect in addition to a physical gas barrier. Thus, water cooling of the gas injection means is not required while still avoiding damage to the gas injection means which might be caused by the high temperatures within the combustion zone.

Preferably, a plurality of composite lance gas injection systems of this invention are employed to separately inject fuel and oxidant into the combustion zone of a furnace. Generally, from 1 to 8 composite lance gas injection systems may be employed in a single combustion system. A furnace or other such facility may employ one or more such combustion systems.

The utility of the composite lance of this invention is particularly valuable under adverse conditions expected in practical commercial operations. When the gas flow is shut down due, for example, to power interruption, the temperature of the nozzle tip will approach the furnace wall temperature. The ceramic frontpiece of the nozzle can withstand the furnace or combustion zone wall temperature and delay or prevent potential overheating of the metallic backpiece because the high thermal conductivity metal used for the lance supply tube transfers and dissipates heat away from the nozzle. This, coupled with the cooling effect from the protective gas flow during operation, enables a long service life for the nozzle despite the severe operating environment. The ceramic frontpiece may crack or break after long service at high temperature. However, since the metallic backpiece of the nozzle has the same inner diameter as the nozzle, the injection velocity and thus the nozzle effectiveness will not be adversely affected.

The following examples are provided to further illustrate the invention. They are not intended to be limiting. A composite lance similar to that illustrated in FIG. 1 was employed to inject oxygen into a glassmelting furnace. The supply tube was comprised of copper. The nozzle had an axial length of 2.0 inches with a stainless steel backpiece having a length of 1.0 inch and an alumina-zirconia-silicate frontpiece having a length of 1.375 inches. The inside diameter of the nozzle was 0.5 inch. The nozzle was connected to the supply tube by a threaded connection. The frontpiece was adjoined to the backpiece by a 0.375 inch long reverse taper joint filled with refractory cement. The composite lance was positioned within a cavity in a refractory wall having a two-inch diameter opening into a combustion zone. The lance was positioned so that the nozzle tip was recessed from the opening by one inch. The lance was connected to a source of technically pure oxygen. The lance had a coaxial air cooling jacket whereby cooling air was provided around the nozzle when the main gas flow through the lance was shut off. Oxygen was ejected through the ceramic nozzle tip in a jet at a velocity of 450 feet per second and at a flowrate of 2200 standard cubic feet per hour. The temperature within the combustion zone was 2800° F. The temperature on the ceramic frontpiece was 1200° F. and the temperature on the metallic backpiece was only 800° F.

The procedure was repeated except that natural gas instead of oxygen was passed through the lance at a flowrate of 1100 standard cubic feet per hour and at a velocity of 225 feet per second. The temperature on the ceramic frontpiece was 1510° F. and the temperature on the metallic backpiece was only 930° F.

Although the invention has been described in detail with reference to a certain preferred embodiment, those skilled in the art will recognize that there are other embodiments of the invention within the spirit and the scope of the claims.

We claim:

1. A composite lance comprising:
   (A) a supply tube comprised of metal;
   (B) a nozzle having a backpiece and a frontpiece, and backpiece comprised of metal different from that comprising the supply tube, said backpiece communicating with the supply tube, said frontpiece comprised of ceramic and adjoining said backpiece, wherein the metallic backpiece comprises from 10 to 60 percent and ceramic frontpiece comprises from 40 to 90 percent of the axial length of the nozzle measured on the inner side of the nozzle;
   (C) at least one aperture through which gas may be ejected from the ceramic frontpiece of the nozzle; and
   (D) means for providing protective gas around the nozzle.

2. The composite lance of claim 1 wherein the means for providing protective gas around the nozzle comprises at least one aperture in the metallic portion of the lance through which gas may flow out from within the lance.

3. The composite lance of claim 2 wherein said at least one aperture in the metallic portion of the lance is in the supply tube.

4. The composite lance of claim 1 wherein the supply tube is comprised of copper and the backpiece is comprised of stainless steel.

5. The composite lance of claim 1 wherein the frontpiece is comprised of alumina-zirconia-silicate refractory.

6. A composite lance gas injection system comprising a cavity within a wall of a combustion zone and having an opening communicating with the combustion zone, and a composite lance within the cavity said composite lance comprising:
   (A) a supply tube comprised of metal and communicating with a source of gas;

(B) a nozzle recessed from the opening, said nozzle having a backpiece and a frontpiece, said backpiece comprised of metal and communicating with the supply tube, said frontpiece comprised of ceramic and adjoining said backpiece wherein the metallic backpiece comprises from 10 to 60 percent and the ceramic frontpiece comprises from 40 to 90 percent of the axial length of the nozzle measured on the inner side of the nozzle;

(C) at least one aperture through which gas may be ejected from the ceramic frontpiece of the nozzle; and (D) means for providing protective gas around the nozzle.

7. The composite lance gas injection system of claim 6 wherein the nozzle is recessed from the opening a distance not exceeding 2 times the diameter of the opening.

8. The composite lance gas injection system of claim 6 wherein the means for providing protective gas around the nozzle comprises at least one aperture in the metallic portion of the lance through which gas may flow out from within the lance.

9. The composite lance gas injection system of claim 6 wherein the outer diameter of the nozzle is within the range of from 0.5 to 0.95 times the diameter of the opening.

10. The composite lance gas injection system of claim 6 wherein the axial length of the nozzle is within the range of from 0.5 to 2.0 times the diameter of the opening.

11. The composite lance gas injection system of claim 6 wherein the backpiece is comprised of metal which is different from that comprising the supply tube.

12. The composite lance gas injection system of claim 11 wherein the supply tube is comprised of copper and the backpiece is comprised of stainless steel.

* * * * *

UNITED STATES PATENT AND TRADEMARK OFFICE
CERTIFICATE OF CORRECTION

PATENT NO. : 5,266,025

DATED : November 30, 1993

INVENTOR(S) : A.W. Francis, Jr. etal

It is certified that error appears in the above-identified patent and that said Letters Patent is hereby corrected as shown below:

Column 6, line 34:
In claim 1, line 3, delete "and" second occurrence and insert therefor --said--.

Signed and Sealed this

Nineteenth Day of April, 1994

Attest:

BRUCE LEHMAN

Attesting Officer  Commissioner of Patents and Trademarks